Dec. 24, 1929.  J. GRETENCORT  1,740,504
CLAY TREATING ATTACHMENT FOR PUG MILLS
Filed March 14, 1928  2 Sheets-Sheet 1

INVENTOR
JOHN GRETENCORT
BY
ATTORNEY

Dec. 24, 1929.   J. GRETENCORT   1,740,504
CLAY TREATING ATTACHMENT FOR PUG MILLS
Filed March 14, 1928   2 Sheets-Sheet 2
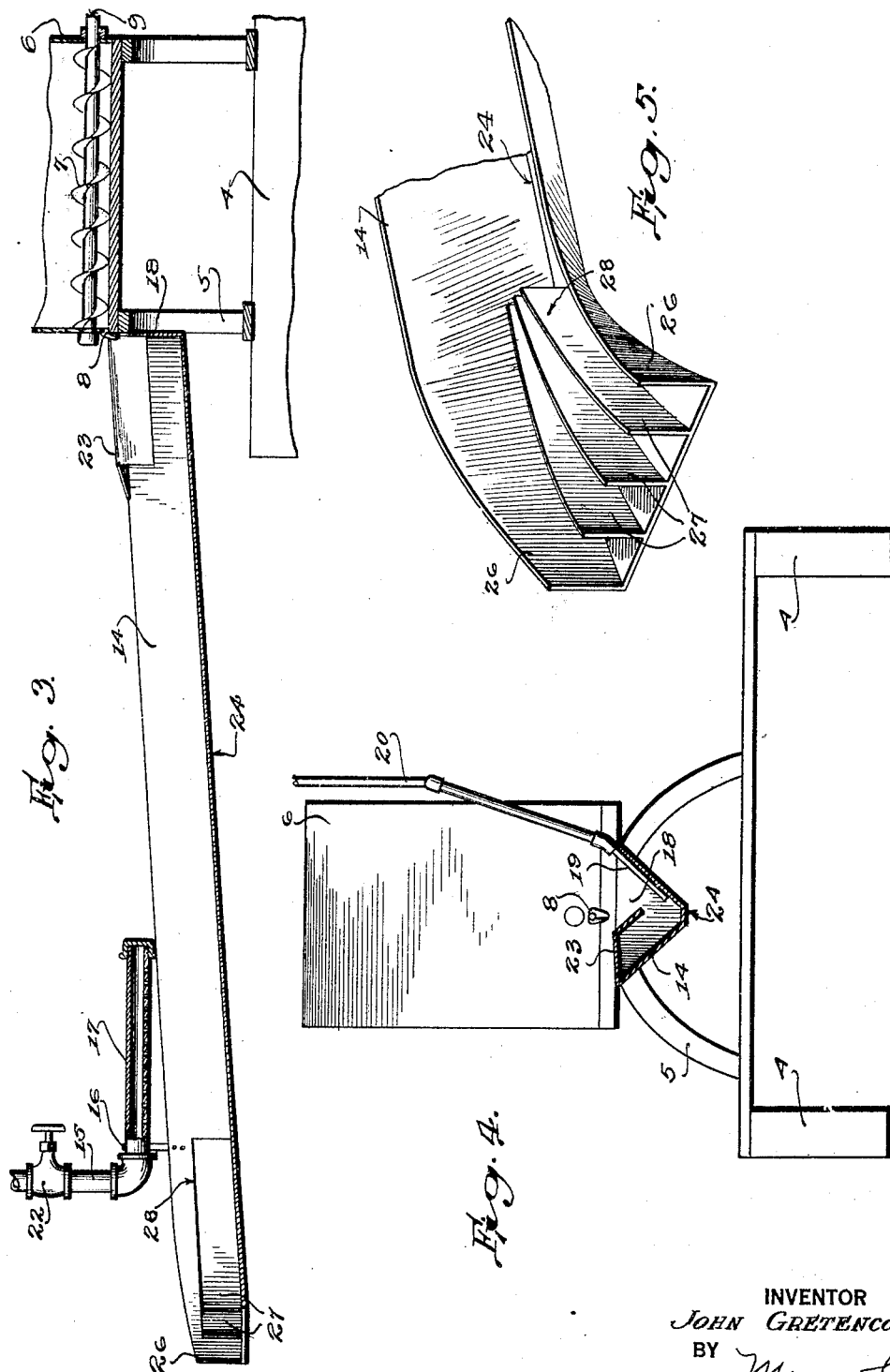
INVENTOR
JOHN GRETENCORT
BY
ATTORNEY Patented Dec. 24, 1929

1,740,504

UNITED STATES PATENT OFFICE

JOHN GRETENCORT, OF LEWISTOWN, MONTANA

CLAY-TREATING ATTACHMENT FOR PUG MILLS

Application filed March 14, 1928. Serial No. 261,607.

This invention relates to improvements in feeding and agitating apparatus, and it consists of the constructions, combinations and arrangements herein described and claimed.

An object of the invention is to provide a feeding and agitating apparatus for mixing certain chemicals and discharging the mixture into the clay of a pug mill, the purpose of this treatment of the clay being to neutralize certain alkalies contained thereby so that the burned product will not have an objectionable appearance.

Another object of the invention is to provide an attachment by which a dry chemical is mixed with a liquid prior to introduction into a substance required to be treated, the nature of the attachment being such that a thorough commingling of the chemical and liquid will result.

Other objects and advantages appear in the following specification, reference being had to the accompanying drawings in which—

Figure 1:
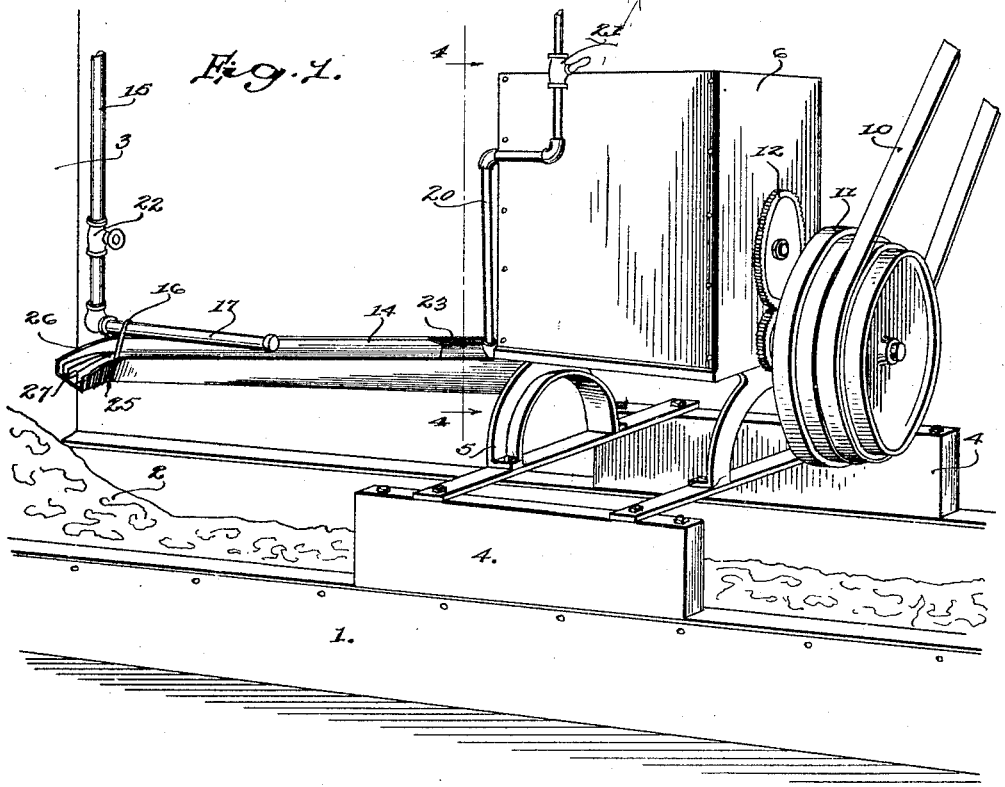
Figure 2:
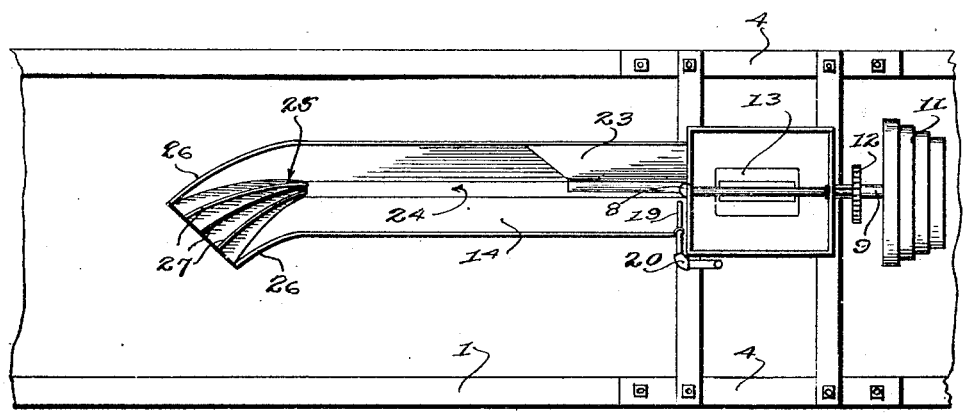

Figure 1 is a perspective view of a portion of a pug mill, the attachment being shown in position upon a chemical feeder, Figure 2 is a plan view of parts shown in Figure 1, Figure 3 is a longitudinal section, Figure 4 is a cross section taken on the line 4—4 of Figure 1, Figure 5 is a detail perspective view of the mixing trough.

It is known that most clays used in the manufacture of clay products contain alkalies which, during the drying period, appear on the surface of the products in the form of scum. While not very noticeable during the period mentioned, the scum turns white after the products have been subjected to burning, thus ruining the appearance of the ware. The foregoing deleterious feature is particularly objectionable in the case of brick or clay wares.

Face brick are generally worth at least three times as much as common brick, and it is obvious at once that the manufacturer may sustain a considerable loss if this particular product becomes marred during the burning operation. Remedies are known, and have been used, for preventing the spoiling of face bricks, these generally comprising the treatment of the clay with chemicals such as natural barium carbonate or precipitated barium carbonate for the purpose of neutralizing any alkali content.

Experience has proved the deficiency of known methods of treatment. These methods may be briefly described as follows: The chemical has been introduced into the clay in a dry state, dependence having been put upon the moisture content of the clay to dissolve the chemical. Whether the dry chemical is thus introduced either at the so-called dry pan or pug mill, the operation is wasteful and unsatisfactory because a very poor mixture is gotten.

Another commonly used method is to employ large water tanks to which the chemical is added. The solution has to be stirred constantly by an agitator. The solution is generally introduced into the clay at the pug mill, but the plan is objectionable because it is expensive, and a lot of trouble is caused by the clogging of the pipes that carry the solution to the clay. It is difficult to keep the chemical in suspension. It is also unsatisfactory because when the clay is dry, more water is required to temper it and naturally more chemical is consumed than may be necessary. On the other hand when the clay is wet it is possible that not enough chemical may be introduced.

It is for the purpose of overcoming all uncertainty in the mixing and introduction of the chemical that the improvement has been devised. Before describing the latter, certain known structures should be identified. 1 designates what is herein known as the pug mill, which appears as nothing more than a trough through which the clay 2 passes from the clay chute 3. Blocks 4 provide the support for the legs 5 of a screw feeder 6 which may be of any known construction.

An auger advances the dry chemical contained by the feeder 6 toward an outlet 8 whence the powdered chemical drops. The shaft 9 of the auger may be driven at variable speeds by shifting the belt 10 in respect to the cone pulley 11. The necessity for changes in the speed of rotation of the auger 7 arises from requirements at times for varied amounts of the chemical. A gear train 12 drives the shaft of an agitator within the feeder.

The attachment comprises a trough 14, preferably composed of copper but obviously capable of manufacture from other suitable material. A pipe 15, by which hot water is introduced into the trough, provides a support for the otherwise free end of the trough. The adjustment of the supporting strap 16 that depends from the outstanding perforated branch 17 is such that the trough assumes an inclination of approximately 1 inch to the foot.

The high end of the trough is closed by a head 18. The head or high end of the trough is secured or supported adjacent to the feeder 6 in any convenient manner. The chemical powder drops into the head end of the trough before being discharged by the feeder. The nozzle 19 of a pipe 20 discharges cold water or some other suitable fluid under pressure against the chemical powder producing a preliminary mixture. A valve 21 controls the flow of cold water. A valve 22, in the pipe 15, controls the flow of hot water. A shield 23 prevents the cold water and chemical from splashing over the side of the trough.

By preference the main body of the trough is substantially V-shaped, the slanting sides meeting at a narrow, flat bottom 24 (Fig. 4). This bottom broadens at 25, the free end of the trough having a formation therein designated a spreading device. The sides 26 of the spreading device are disposed at right angles to the broad bottom 25, at the discharge end of the latter, it being observed in Figure 5 that the sides 26 at once begin to properly merge with the slanting sides of the trough 14 so that there may be continuity between the two points. A plurality of wings 27 is mounted upon the bottom 25.

The wings are furthest apart at the discharge end of the broadened bottom. They converge as clearly shown in Figures 2 and 5. The material discharged by the trough 14 is divided into a number of streams by the wings 27. The hot water discharged by the branch 17 near the end of the trough 14 aids in the mixing of the chemical and water, which mixing is completed by a thorough agitation of these elements while passing through the channels produced by the wings of the spreading device.

The operation is readily understood. The operation of the screw feeder 6 causes a discharge of chemical powder at the outlet 8 into the head end of the trough 14. Cold water, dashing into the powder from the nozzle 19, produces a preliminary mixture. While the shield 23 prevents the water from splashing over the side of the trough it also aids in causing a vortical or swirling action of the water transversely of the major axis of the trough which action continues throughout the flow of the latter along the substantially V-shaped trough.

At any rate the water and chemical will be in considerable agitation. Hot water is introduced from the branch 17 through ¼" holes into the foregoing mixture.

The addition of the hot water produces a thorough mixture. While cold water might be used at this point it has been found that better results are obtained with hot water. The mixture immediately proceeds to the spreading device which not only keeps up the agitation but also spreads the solution so that the clay 2 is adequately covered.

An outstanding advantage of the attachment over known methods of treating clay is that the desired chemicals are introduced into the clay in uniform quantities. The chemical is supplied at the same rate no matter what the moisture content of the clay may be. The attachment has been proved more economical of the chemical substance and is both easy to manufacture and install. The mode of support of the trough 14 is simple in nature, use having been made of the most convenient places. Any other convenient mode of support may be employed in substitution of that shown.

It should be noted that the trough can be made either longer or shorter than the drawings would appear to indicate. In other words, the trough may be made as long or as short as desired. It is also possible to so arrange the spreading device that it will discharge in a direction other than that indicated. It may discharge to the opposite side, or it may even discharge straight ahead.

While the construction and arrangement of the improved clay treating attachment is that of a generally preferred form, obviously modifications and changes may be made without departing from the spirit of the invention, or the scope of the claims.

I claim:—

1. Feeding and agitating apparatus comprising open receiving means into which a comminuted substance is discharged, means to inject a stream of liquid into the substance at one end of the receiving means, a shield to prevent splashing over of the liquid and substance to set up a swirling action, a spreading device at the opposite end of the receiving means including a plurality of variously directed wings interrupting the swirling action and forming a plurality of channels through which the liquid and substance are discharged, and means for discharging a liquid into the trough adjacent to said spreading device.

2. Feeding and agitating apparatus comprising a trough, means for feeding a comminuted substance into the trough, and means to introduce liquid under pressure into the trough to produce vortical agitation of the liquid and said substance transversely of the major axis of the trough.

3. Feeding and agitating apparatus comprising a trough, means for feeding a comminuted substance into the trough, means to introduce liquid under pressure into the trough to produce vortical agitation of the liquid and said substance transversely of the major axis of the trough, and means at the discharge end of the trough for destroying the vortical action and spreading the liquid and substance in a calm stream.

4. Feeding and agitating apparatus comprising a trough, means for feeding a comminuted substance into the trough, means to introduce liquid under pressure into the trough to produce vortical agitation of the liquid and said substance transversely of the major axis of the trough, and means over the trough near the discharge end for again introducing liquid under pressure into the trough to produce a thorough mixture.

5. Feeding and agitating apparatus comprising a trough, means for feeding a comminuted substance into the trough, a nozzle for introducing liquid under pressure into the trough from one side, and means on the other side of the trough preventing splashing over and setting up vortical agitation of the liquid and said substance transversely of the major axis of the trough.

Signed at Lewistown, in the county of Fergus and State of Montana, this 23rd day of February, A. D. 1928.

JOHN GRETENCORT.